United States Patent
Toda (10) Patent No.: US 9,798,016 B2
(45) Date of Patent: Oct. 24, 2017

(54) POSITIONING PROCESSING APPARATUS, POSITIONING PROCESSING METHOD, AND RECORDING MEDIUM

(71) Applicant: CASIO COMPUTER CO., LTD., Shibuya-ku, Tokyo (JP)

(72) Inventor: Naoto Toda, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 659 days.

(21) Appl. No.: 14/220,083

(22) Filed: Mar. 19, 2014

(65) Prior Publication Data

US 2014/0285377 A1 Sep. 25, 2014

(30) Foreign Application Priority Data

Mar. 21, 2013 (JP) .................................. 2013-058762

(51) Int. Cl.
  *G01S 19/34* (2010.01)
  *G01S 19/27* (2010.01)

(52) U.S. Cl.
  CPC .............. *G01S 19/34* (2013.01); *G01S 19/27* (2013.01)

(58) Field of Classification Search
  CPC .......... G01S 19/34; G01S 19/27; G01S 19/16; G01S 19/06; G01S 19/05; G01S 19/13;
  (Continued)

(56) References Cited

U.S. PATENT DOCUMENTS 7,158,080 B2   1/2007  van Diggelen
7,336,224 B2 * 2/2008  King ....................... G01S 19/34
                                                          342/357.64
(Continued)

FOREIGN PATENT DOCUMENTS

CN    102118555 A   7/2011
JP    2006502417 A   1/2006
(Continued)

OTHER PUBLICATIONS

Chinese Office Action (and English translation thereof) dated Feb. 6, 2016, issued in counterpart Chinese Application No. 201410105338.3.

(Continued)

*Primary Examiner* — Gregory C Issing
(74) *Attorney, Agent, or Firm* — Holtz, Holtz & Volek PC (57) ABSTRACT

A present invention relates to a positioning processing apparatus including: an orbit information receiving unit that receives Ephemeris relating to an orbit of a GPS satellite from the GPS satellite; a predicted orbit information receiving unit that receives a predicted value of the Ephemeris via a network from a server in which the Ephemeris is accumulated in advance; a power feeding unit that performs control relating to electric power supply; a first determination unit that determines a state of electric power supply; a selection unit that selects the orbit information receiving unit or the predicted orbit information receiving unit based on the state of electric power supply determined; and a positioning unit that performs positioning based on the Ephemeris or a predicted value of the Ephemeris received by the orbit information receiving unit or the predicted orbit information receiving unit selected by the selection unit.

7 Claims, 6 Drawing Sheets (58) Field of Classification Search
CPC ....... H04N 5/232; B60R 25/04; H04W 4/021; G06F 21/81
USPC .................................................. 342/357.74
See application file for complete search history.

(56) References Cited

U.S. PATENT DOCUMENTS

| | | | | |
|---|---|---|---|---|
| 7,812,765 B2 * | 10/2010 | Kim | ........................ | G01S 19/13 342/357.74 |
| 8,014,233 B2 | 9/2011 | Matsuzaki | | |
| 8,120,530 B2 | 2/2012 | Weng | | |
| 8,982,240 B2 | 3/2015 | Akiyoshi et al. | | |
| 9,417,329 B2 * | 8/2016 | Forutanpour | ............ | G01S 19/34 |
| 2002/0105442 A1 * | 8/2002 | Flick | ........................ | B60R 25/04 340/988 |
| 2004/0117114 A1 | 6/2004 | van Diggelen | | |
| 2007/0182628 A1 * | 8/2007 | Pomerantz | .............. | G01S 19/06 342/357.43 |
| 2007/0200752 A1 * | 8/2007 | van Diggelen | ......... | G01S 19/05 342/357.31 |
| 2008/0129593 A1 * | 6/2008 | Garin | ..................... | G01S 19/27 342/357.66 |
| 2009/0115660 A1 * | 5/2009 | Garin | ..................... | G01S 19/05 342/357.64 |
| 2009/0135674 A1 | 5/2009 | Matsuzaki | | |
| 2009/0303122 A1 | 12/2009 | Weng | | |
| 2011/0164148 A1 * | 7/2011 | Akiyoshi | ................ | H04N 5/232 348/231.99 |
| 2011/0273327 A1 | 11/2011 | Weng et al. | | |
| 2012/0235860 A1 * | 9/2012 | Ghazarian | ................ | G01S 19/16 342/357.4 |
| 2012/0274509 A1 * | 11/2012 | Tsai | ........................ | G01S 19/34 342/357.25 |
| 2013/0203440 A1 * | 8/2013 | Bilange | ................. | H04W 4/021 455/456.2 |
| 2013/0238700 A1 * | 9/2013 | Papakipos | ................ | G06F 21/81 709/204 |

FOREIGN PATENT DOCUMENTS

| | | |
|---|---|---|
| JP | 2009036622 A | 2/2009 |
| JP | 2009128179 A | 6/2009 |
| JP | 2011047922 A | 3/2011 |
| JP | 2011128047 A | 6/2011 |
| JP | 2011-141144 A | 7/2011 |

OTHER PUBLICATIONS

Japanese Office Action (and English translation thereof) dated Feb. 14, 2017 issued in counterpart Japanese Application No. 2013-058762.

* cited by examiner

POSITIONING PROCESSING APPARATUS, POSITIONING PROCESSING METHOD, AND RECORDING MEDIUM

This application is based on and claims the benefit of priority from Japanese Patent Application No. 2013-058762, filed on 21 Mar. 2013, the content of which is incorporated herein by reference.

BACKGROUND OF THE INVENTION

Field of the Invention

The present invention relates to a positioning processing apparatus, a positioning processing method, and a recording medium.

Related Art

Thus far, a positioning processing apparatus has been known that performs positioning using GPS (Global Positioning System).

When performing positioning using GPS, although it is desired to distinguish a position within a short time of period, it requires a certain period of time to receive from GPS satellites information relating to the orbits of the GPS satellites for positioning (hereinafter, referred to as "Ephemeris").

For this reason, it is difficult to shorten the period of time required for distinguishing a position to a period of time less than a certain period of time upon adopting the method of receiving Ephemeris from the GPS satellites.

In order to address this problem, for example, Japanese Unexamined Patent Application, Publication No. 2011-141144 describes, as a method for distinguishing a position more promptly, a method adopting predicted Ephemeris that is acquired in advance prior to positioning, which is different from Ephemeris that is received from the GPS satellites upon positioning.

For the predicted Ephemeris, predicted Ephemeris accumulated in an assist server (hereinafter, referred to as "download-type predicted Ephemeris") and predicted Ephemeris calculated at a GPS receiver based on the Ephemeris received from a GPS satellite (hereinafter, referred to as "self-predicted Ephemeris") have been known.

It is possible to perform positioning promptly compared to the case of receiving Ephemeris from a GPS satellite using a predicted Ephemeris.

However, the download-type predicted Ephemeris can receive a vast amount of predicted Ephemeris (for example, an amount for a month) via the network while it consumes a greater amount of energy for accessing the network compared to the case of receiving Ephemeris from the GPS satellite. Furthermore, the self-predicted Ephemeris has a shorter validated period of time during which predicted Ephemeris can be calculated (for example, three days) compared to that of the download-type predicted Ephemeris.

Therefore, a period of time that can realize positioning promptly using predicted Ephemeris is not sufficient. As such, it has been difficult with the conventional technologies to reduce power consumption appropriately and perform positioning promptly.

SUMMARY OF THE INVENTION

The present invention addresses such problems and it is an object of the present invention to reduce power consumption appropriately and perform positioning promptly.

According to an aspect of the present invention, a positioning processing apparatus is provided which includes: an orbit information receiving unit that receives Ephemeris relating to an orbit of a GPS satellite from the GPS satellite; a predicted orbit information receiving unit that receives a predicted value of the Ephemeris via a network from a server in which the Ephemeris is accumulated in advance; a power feeding unit that performs control relating to electric power supply; a first determination unit that determines a state of electric power supply by the power feeding unit; a selection unit that selects the orbit information receiving unit or the predicted orbit information receiving unit based on the state of electric power supply determined by the first determination unit; and a positioning unit that performs positioning based on the Ephemeris or a predicted value of the Ephemeris received by the orbit information receiving unit or the predicted orbit information receiving unit selected by the selection unit.

According to an aspect of the present invention, a positioning processing method using a positioning processing apparatus is provided which including: an orbit information receiving unit that receives Ephemeris relating to an orbit of a GPS satellite from the GPS satellite; a predicted orbit information receiving unit that receives a predicted value of the Ephemeris via a network from a server in which the Ephemeris is accumulated in advance; and a power feeding unit that performs control relating to electric power supply, includes: a determination step of determining a state of electric power supply by the power feeding unit; a selection step of selecting the orbit information receiving unit or the predicted orbit information receiving unit based on the state of electric power supply determined in the determination step; and a positioning step of performing positioning based on the Ephemeris or a predicted value of the Ephemeris received by the orbit information receiving unit or the predicted orbit information receiving unit selected in the selection step.

According to an aspect of the present invention, a non-transitory storage medium is provided which is encoded with a computer-readable program that enables a computer having a positioning apparatus to execute: an orbit information receiving function of receiving Ephemeris relating to an orbit of a GPS satellite from the GPS satellite; a predicted orbit information receiving function of receiving a predicted value of the Ephemeris via a network from a server at which the Ephemeris is accumulated in advance; a power feeding function of performing control relating to electric power supply; a first determination function that determines a state of electric power supply by the power feeding unit; a selection function of selecting the orbit information receiving function or the predicted orbit information receiving function based on the state of electric power supply determined by the first determination function; and a positioning function of performing positioning based on the Ephemeris or a predicted value of the Ephemeris received by way of the orbit information receiving function or the predicted orbit information receiving function selected by way of the selection function.

DETAILED DESCRIPTION OF THE INVENTION

In the following, embodiments of the present invention are explained with reference to the drawings.

Figure 1:
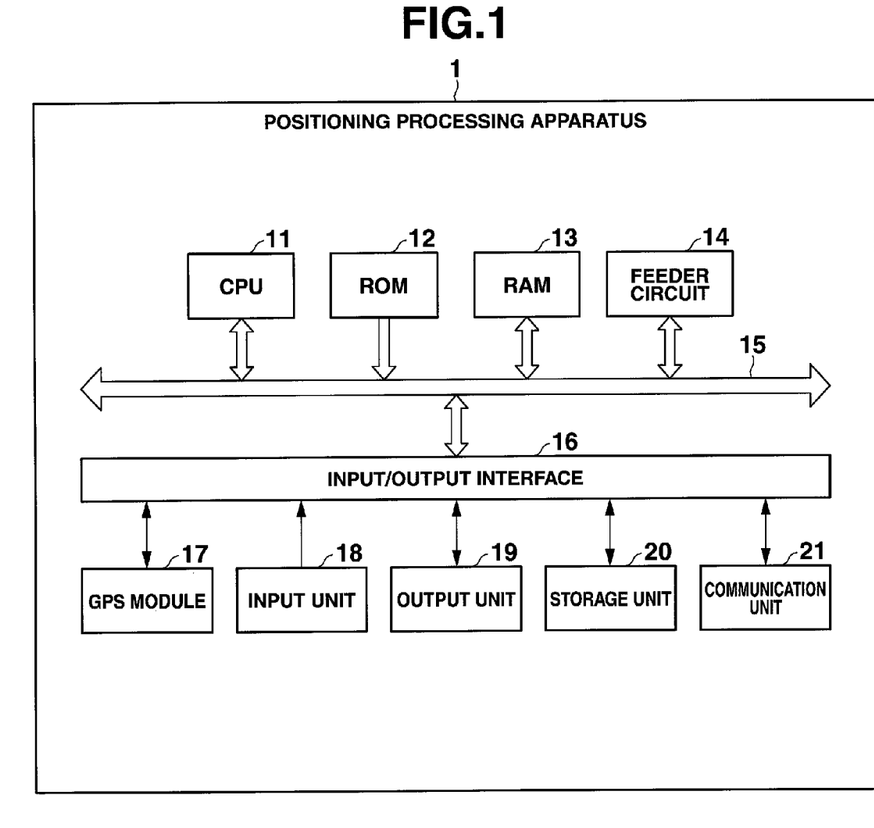
FIG. 1 is a block diagram showing a hardware configuration of a positioning processing apparatus according to an embodiment of the present invention.

FIG. 1 is a block diagram showing a hardware configuration of a positioning processing apparatus 1 according to an embodiment of the present invention.

The positioning processing apparatus 1 is, for example, configured as a wristwatch having a GPS function.

The positioning processing apparatus 1 includes a CPU (Central Processing Unit) 11, ROM (Read Only Memory) 12, RAM (Random Access Memory) 13, a feeder circuit 14, a bus 15, an input/output interface 16, a GPS module 17, an input unit 18, an output unit 19, a storage unit 20, and a communication unit 21.

The CPU 11 controls the overall positioning processing apparatus 1 and executes various processing according to programs that are recorded in the ROM 12, or programs that are loaded from the storage unit 20 to the RAM 13.

The RAM 13 also stores data and the like necessary for the CPU 11 to execute the various processing, as appropriate.

The feeder circuit 14 controls power supply to the positioning processing apparatus 1 from a battery (not illustrated) and an external power source equipped with the positioning processing apparatus 1. Furthermore, the feeder circuit 14 performs monitoring of the remaining amount of battery and control of charging of the battery, as well as detecting that electric power is supplied to the positioning processing apparatus 1 from an external power supply. Information relating to the control of the power feeding by way of the feeder circuit 14 is outputted to the CPU 11.

The CPU 11, the ROM 12, the RAM 13, and the feeder circuit 14 are connected to one another via the bus 15. The input/output interface 16 is also connected to the bus 15. The GPS module 17, the input unit 18, the output unit 19, the storage unit 20, and the communication unit 21 are connected to the input/output interface 16.

The GPS module 17 acquires an Almanac, which is general information relating to the orbits of GPS satellites (for example, which satellites exist in orbit in which period) and Ephemeris, which is information relating to an orbit of a GPS satellite with precision higher than the Almanac (a specific orbit schedule, etc. of each satellite). Then, the GPS module 17 performs positioning using the Almanac and Ephemeris thus acquired and time information received. Furthermore, the GPS module 17 performs positioning using Ephemeris received from GPS satellites as well as the download-type predicted Ephemeris and the self-predicted Ephemeris calculated from the Ephemeris thus received or the download-type predicted Ephemeris.

The input unit 18 is configured by various buttons and inputs various information in accordance with a user's operational instruction.

The output unit 19 is configured by a display, a speaker, and the like, and outputs images and sounds.

The storage unit 20 is configured by a hard disk, DRAM (Dynamic Random Access Memory), or the like, and stores a variety of programs.

The communication unit 21 controls communications with another apparatus (not illustrated) via a network including the Internet.

Figure 2:
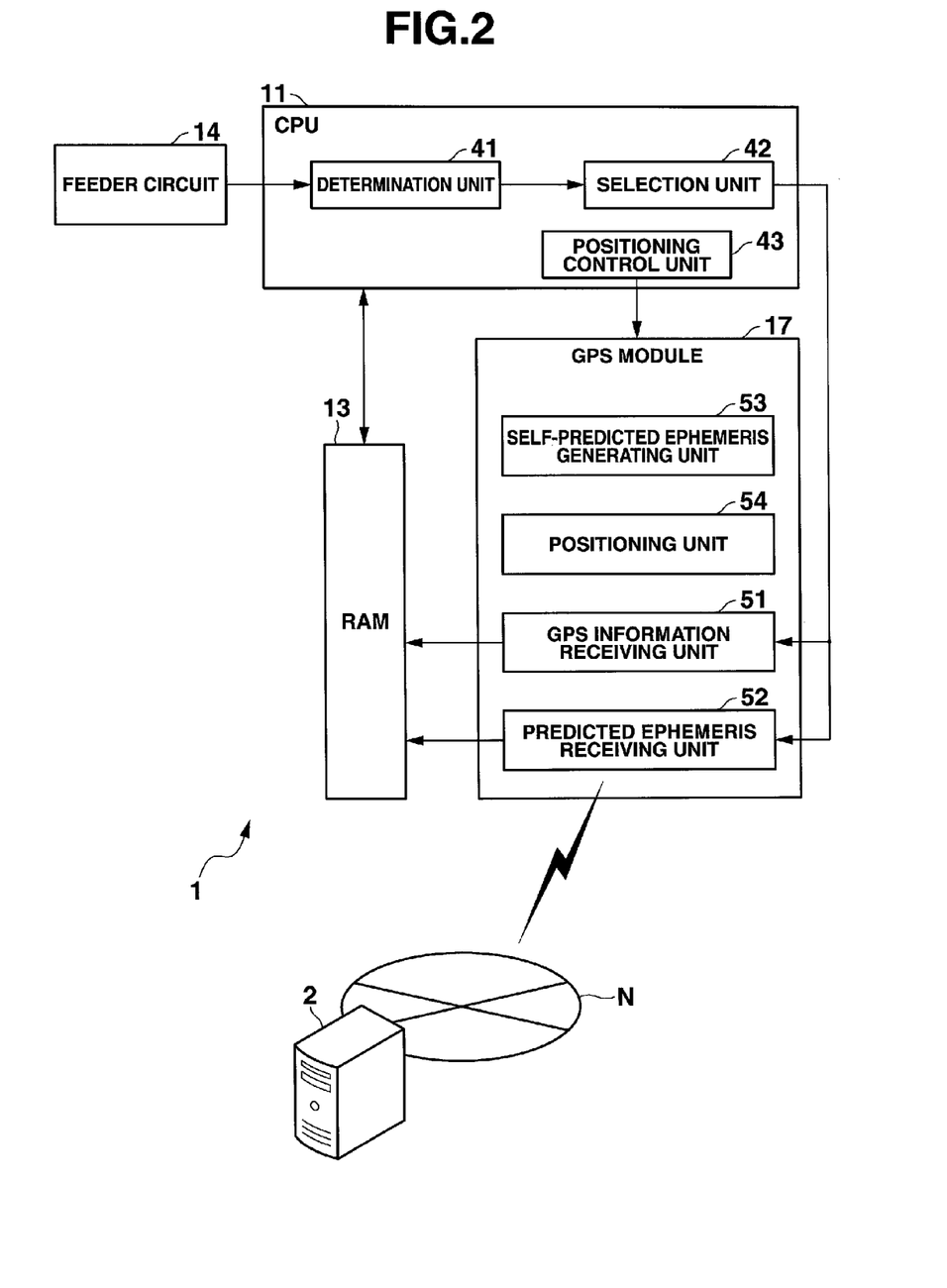
FIG. 2 is a functional block diagram showing a functional configuration for executing positioning processing, among the functional configurations of the positioning processing apparatus of FIG. 1.

FIG. 2 is a functional block diagram showing a functional configuration for executing positioning processing, among the functional configurations of the positioning processing apparatus of FIG. 1.

It should be noted that FIG. 2 shows the functional configuration of the positioning processing apparatus 1, an assist server 2 that accumulates predicted Ephemeris from each GPS satellite, and a network N that is configured so as to communicably connect the positioning processing apparatus 1 with the assist server 2.

The positioning processing refers to a sequence of processing of: starting up the GPS module 17; executing positioning by way of GPS; and acquiring predicted Ephemeris used for positioning according to a status of power feeding of the positioning processing apparatus 1.

The positioning processing includes predicted Ephemeris updating processing that acquires predicted Ephemeris according to a state of power feeding of the positioning processing apparatus 1.

When executing the positioning processing, a determination unit 41, a selection unit 42, and a positioning control unit 43 function in the CPU 11.

The determination unit 41 determines a state of power feeding of the positioning processing apparatus 1 based on information relating to power feeding outputted from the feeder circuit 14. In the present embodiment, the determination unit 41 determines, as a state of power feeding, whether it is a state in which a battery (not illustrated) of the positioning processing apparatus 1 is being recharged (during recharging) or whether the remaining batter level (the remaining amount of a battery) is less than a predetermined threshold.

After the GPS module 17 stops positioning, the selection unit 42 selects a functioning unit to acquire Ephemeris used for subsequent positioning or predicted Ephemeris, based on a state of power feeding of the positioning processing apparatus 1 and a state of retaining Ephemeris in the positioning processing apparatus 1 determined by the determination unit 41.

In other words, in a case in which the electric power to be supplied is sufficient, such as when a battery is during recharging or the remaining battery level is equal or greater than a threshold, and in a case in which the positioning processing apparatus 1 is connected with the network N, the selection unit 42 selects a predicted Ephemeris receiving unit 52. On the other hand, in a case in which the electric power to be supplied is not sufficient, such as when a battery is not during recharging or the remaining battery level is less than a threshold or in a case in which the positioning processing apparatus 1 not being connected with the network N, the selection unit 42 selects self-predicted Ephemeris generating unit 53.

The positioning control unit 43 executes control to execute processing of activating the GPS module 17, processing of instructing positioning stop, or predicted Ephemeris updating processing.

Furthermore, when the positioning processing is executed, the GPS information receiving unit 51, the predicted Ephemeris receiving unit 52, the self-predicted Ephemeris generating unit 53, and the positioning unit 54 function in the GPS module 17.

The GPS information receiving unit 51 acquires the Almanac and Ephemeris sent from a plurality of GPS satellites. Furthermore, time information is sent from each GPS satellite and the GPS information receiving unit 51 acquires the time information in addition to the Almanac and Ephemeris.

It should be noted that, regarding Ephemeris acquired from the GPS satellite by the GPS information receiving unit 51, the period that can be used for positioning (validated period) is limited to four hours at maximum.

In accordance with the instructions of the selection unit 42, the predicted Ephemeris receiving unit 52 downloads predicted Ephemeris of the plurality of GPS satellites accumulated at the assist server 2 (download-type predicted Ephemeris) by an amount for a predetermined period of time (here, a month) via the network N in accordance with the instructions from the selection unit 42.

The self-predicted Ephemeris generating unit 53 generates predicted Ephemeris (self-predicted Ephemeris) by calculating a predicted orbit of a satellite based on Ephemeris acquired by the GPS information receiving unit 51 or the download-type predicted Ephemeris acquired by the predicted Ephemeris receiving unit 52.

The positioning unit 54 calculates a location of the positioning processing apparatus 1 based on Ephemeris of the plurality of GPS satellites and time information thereof. More specifically, the positioning unit 54 calculates a location on the earth's surface using Ephemeris of three GPS satellites or predicted Ephemeris in a case of two-dimensional positioning and calculates a location and altitude on the earth's surface using Ephemeris of four GPS satellites or predicted Ephemeris in a case of three-dimensional positioning.

Furthermore, at the time of activating the GPS module 17, the positioning unit 54 calculates a location of the positioning processing apparatus 1 using predicted Ephemeris in a case of not retaining Ephemeris received from the GPS satellite.

Furthermore, the positioning unit 54 determines a remaining amount of predicted Ephemeris retained by the positioning processing apparatus 1 (an amount of predicted Ephemeris within a validated period). When the positioning unit 54 determines that a remaining amount of predicted Ephemeris is less than a threshold (for example, less than the amount for three days), downloading of the download-type Ephemeris by the predicted Ephemeris receiving unit 52 or generation of self-predicted Ephemeris at the self-predicted Ephemeris generating unit 53 is executed according to a remaining battery level or a connection state with the network N.

Figure 3:
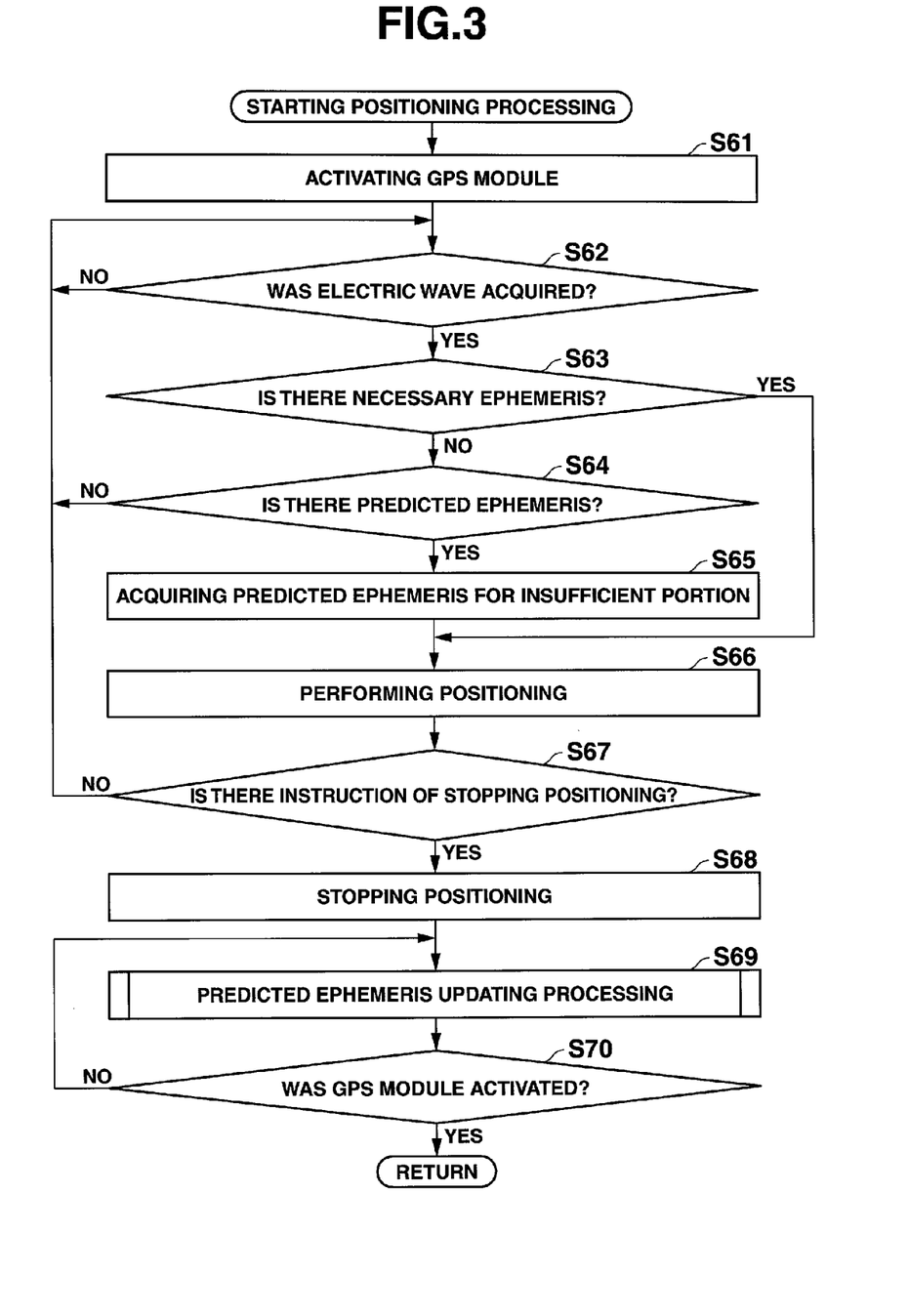
FIG. 3 is a flowchart illustrating the flow of positioning processing of the positioning processing apparatus of FIG. 1 having the functional configuration of FIG. 2.

FIG. 3 is a flowchart illustrating the flow of positioning processing executed by the positioning processing apparatus 1 of FIG. 1 having the functional configuration of FIG. 2.

The positioning processing starts by the activation of the GPS module 17 being instructed. It should be noted that the instruction of activating the GPS module 17 may be, for example, automatically performed with a constant cycle or may be performed by a user's operation.

In Step S61, the positioning control unit 43 activates the GPS module 17.

In Step S62, the GPS information receiving unit 51 determines whether an electric wave sent from a GPS satellite was acquired.

In a case in which the electric wave sent from the GPS satellite was not acquired, it is determined as NO in Step S62, and the processing returns to Step S62.

On the other hand, in a case in which the electric wave sent from the GPS satellite was acquired, it is determined as YES in Step S62, and the processing advances to Step S63.

In Step S63, the positioning unit 54 determines whether the positioning processing apparatus 1 retains all of Ephemeris necessary for positioning.

In a case in which the positioning processing apparatus 1 does not retain all of Ephemeris necessary for positioning, it is determined as NO in Step S63 and the processing advances to Step S64.

On the other hand, in a case in which the positioning processing apparatus 1 retains all of Ephemeris necessary for positioning, it is determined as YES in Step S63 and the processing advances to Step S66.

In Step S64, the positioning unit 54 determines whether the positioning processing apparatus 1 is retaining predicted Ephemeris.

In a case in which the positioning processing apparatus 1 is retaining predicted Ephemeris, it is determined as YES in Step S64 and the processing advances to Step S65.

On the other hand, in a case in which the positioning processing apparatus 1 is not retaining predicted Ephemeris in Step S64, it is determined as NO in Step S64 and the processing returns to Step S62.

In Step S65, the positioning unit 54 acquires a certain amount of predicted Ephemeris corresponding to the amount necessary for the positioning processing apparatus 1 to perform positioning (the amount corresponding to insufficient Ephemeris for performing positioning).

In Step S66, the positioning unit 54 performs positioning of the location of the positioning processing apparatus 1 using Ephemeris or predicted Ephemeris.

In Step S67, the positioning control unit 43 determines whether positioning stop of the GPS module 17 is instructed.

In a case of positioning stop of the GPS module 17 being instructed, it is determined as YES in Step S67 and the processing advances to Step S68.

On the other hand, in a case in which positioning stop of the GPS module 17 is not instructed, it is determined as NO in Step S67 and the processing returns to Step S62.

In Step S68, the positioning control unit 43 stops positioning of the GPS module 17.

In Step S69, the positioning control unit 43 causes the GPS module 17 to execute predicted Ephemeris updating processing.

In Step S70, the positioning control unit 43 determines whether activation of the GPS module 17 was instructed.

In a case in which the activation of the GPS module 17 is instructed, it is determined as YES in Step S70 and the processing returns to Step S61.

On the other hand, in a case in which the activation of the GPS module 17 is not directed, it is determined as NO in Step S70 and the processing returns to Step S69.

Figure 4:
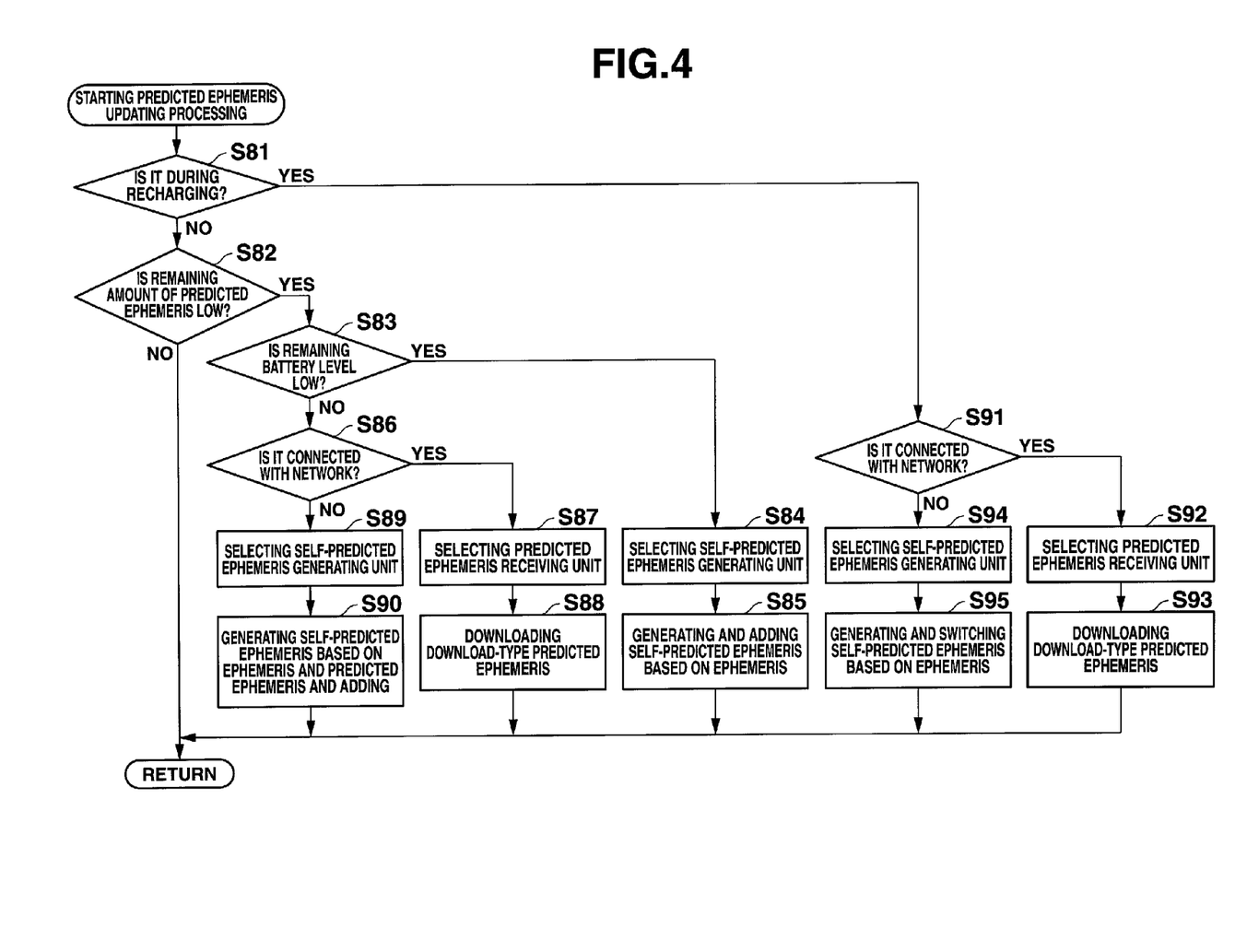
FIG. 4 is a flowchart illustrating the flow of predicted Ephemeris updating processing.

FIG. 4 is a flowchart showing the flow of the predicted Ephemeris updating processing shown in Step S69 of FIG. 3.

In Step S81, the determination unit 41 determines whether the positioning processing apparatus 1 is during recharging.

In a case in which the positioning processing apparatus 1 is not during recharging, it is determined as NO in Step S81 and the processing advances to Step S82.

On the other hand, in a case in which the positioning processing apparatus 1 is during recharging, it is determined as YES in Step S81 and the processing advances to Step S91.

In Step S82, the positioning unit 54 determines whether the remaining amount of predicted Ephemeris (the amount of predicted Ephemeris within a validated period) is less than a threshold (for example, an amount less than three days).

In a case in which the remaining amount of predicted Ephemeris is equal to or greater than a threshold, it is determined as NO in Step S82 and the processing returns to the positioning processing of FIG. 3.

On the other hand, in a case in which the remaining amount of predicted Ephemeris is less than a threshold, it is determined as YES in Step S82 and the processing advances to Step S83.

In Step S83, the determination unit 41 determines whether a remaining battery level is less than a threshold.

In a case in which the remaining battery level is less than a threshold, it is determined as YES in Step S83 and the processing advances to Step S84.

On the other hand, in a case in which the remaining battery level is equal to or greater than a threshold, it is determined as NO in Step S83 and the processing advances to Step S86.

In Step S84, the selection unit 42 selects the self-predicted Ephemeris generating unit 53.

In Step S85, the self-predicted Ephemeris generating unit 44 generates self-predicted Ephemeris based on Ephemeris acquired from a GPS satellite and adds self-predicted Ephemeris thus calculated to data of predicted Ephemeris retained by the positioning processing apparatus 1.

After the processing of Step S84, the processing returns to the positioning processing of FIG. 3.

In Step S86, the selection unit 42 determines whether the predicted Ephemeris receiving unit 52 is connected with the network N.

If the predicted Ephemeris receiving unit 52 is connected with the network N, it is determined as YES in Step S85 and the processing advances to Step S87.

If the predicted Ephemeris receiving unit 52 is not connected with the network N, it is determined as NO in Step S85 and the processing advances to Step S89.

In Step S87, the selection unit 42 selects the predicted Ephemeris receiving unit 52.

In Step S88, the predicted Ephemeris receiving unit 52 downloads download-type predicted Ephemeris from the assist server 2 via the network N.

After the processing of Step S88, the processing returns to the positioning processing of FIG. 3.

In Step S89, the selection unit 42 selects the self-predicted Ephemeris generating unit 53.

In Step S90, the self-predicted Ephemeris generating unit 53 generates Ephemeris acquired from GPS satellites and the self-predicted Ephemeris based on the predicted Ephemeris and adds these Ephemeris to data of the predicted Ephemeris retained by the positioning processing apparatus 1.

After the processing of Step S90, the processing returns to the positioning processing of FIG. 3.

In Step S91, the positioning unit 54 determines whether the predicted Ephemeris receiving unit 52 is connected with the network N.

If the predicted Ephemeris receiving unit 52 is connected with the network N, it is determined as YES in Step S91 and the processing advances to Step S92.

On the other hand, if the predicted Ephemeris receiving unit 52 is not connected with the network N, it is determined as NO in Step S91 and the processing advances to Step S94.

In Step S92, the selection unit 42 selects the predicted Ephemeris receiving unit 52.

In Step S93, the predicted Ephemeris receiving unit 52 downloads the download-type predicted Ephemeris from the assist server 2.

After the processing of Step S93, the processing returns to the positioning processing of FIG. 3.

In Step S94, the selection unit 42 selects the self-predicted Ephemeris generating unit 53.

In Step S95, the self-predicted Ephemeris generating unit 53 generates the self-predicted Ephemeris based on Ephemeris acquired from a GPS satellite and switches the self-predicted Ephemeris thus generated with the predicted Ephemeris retained by the positioning processing apparatus 1.

After the processing of Step S95, the processing returns to the positioning processing of FIG. 3.

As described above, in a case in which it is during recharging or it is not during recharging and the remaining battery level is not low (equal to or greater than a threshold), if the network N is available, the positioning processing apparatus 1 according to the present embodiment acquires download-type predicted Ephemeris that can acquire a vast amount of data. On the other hand, in a case in which it is not during recharging and the remaining battery level is low (less than a threshold), the positioning processing apparatus 1 generates self-predicted Ephemeris. Then, upon performing positioning, if Ephemeris was not received sufficiently from GPS satellites, the positioning processing apparatus 1 performs positioning using the download-type predicted Ephemeris or the self-predicted Ephemeris.

Therefore, it is possible to perform positioning promptly by appropriately select either the download-type predicted Ephemeris that can acquire a vast amount of predicted Ephemeris but consumes a great amount of energy or the self-predicted Ephemeris that has a relatively small amount of data and consumes less energy, depending on whether the electric power to be supplied is sufficient.

In other words, according to the positioning processing apparatus 1, it is possible to appropriately reduce power consumption and perform positioning promptly.

Application Example 1

Figure 5:
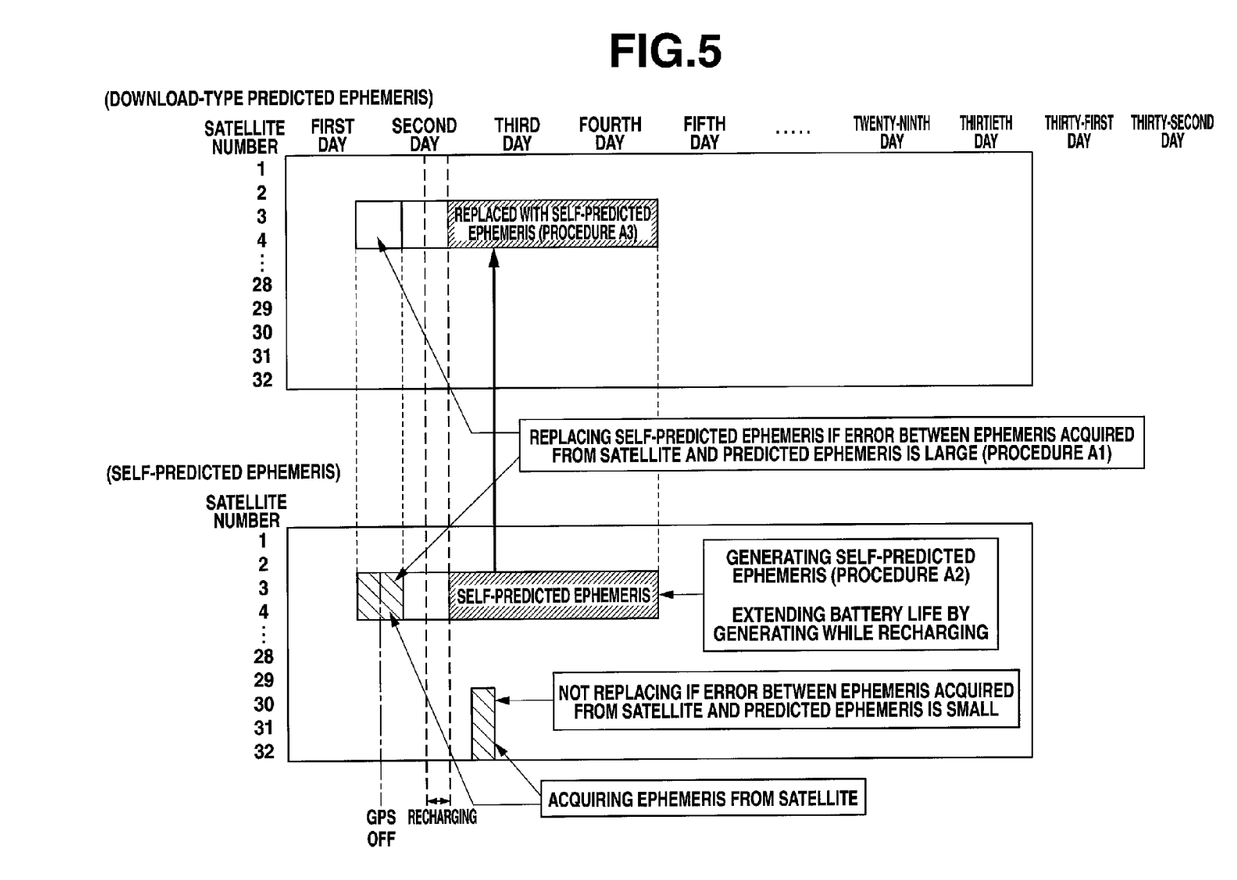
FIG. 5 is a view illustrating an application example of operations of the positioning processing apparatus 1.

FIG. 5 is a view illustrating an application example of operations of the positioning processing apparatus 1.

FIG. 5 shows a relationship between the number of GPS satellites (1 to 32) and the acquisition date of the download-type predicted Ephemeris (upper side) and the self-predicted Ephemeris (lower side).

In FIG. 5, the predicted Ephemeris receiving unit 52 receives the download-type predicted Ephemeris on the first day. It should be noted that the validated period of the download-type predicted Ephemeris is 30 days.

Furthermore, on the first day, the GPS information receiving unit 51 acquires Ephemeris from GPS satellites (satellite numbers 3 and 4), and then positioning stops.

At this stage, regarding the GPS satellites of the satellite numbers 3 and 4, if an error is great between the download-type predicted Ephemeris and Ephemeris acquired from the GPS satellites (if a difference is equal to or greater than a threshold), the positioning control unit 43 replaces the download-type predicted Ephemeris stored in the RAM 13, etc. with Ephemeris acquired from the GPS satellites (procedure A1). Then, when the positioning processing apparatus 1 is recharged on the second day, the self-predicted Ephemeris generating unit 53 generates self-predicted Ephemeris from the Ephemeris acquired on the first day for the GPS satellites of the satellite numbers 3 and 4 (procedure A2).

In this way, it is possible to extend battery life by the self-predicted Ephemeris being generated while recharging.

Furthermore, since the self-predicted Ephemeris generated by procedure A2 has higher precision than the download-type predicted Ephemeris does, the positioning control unit 43 replaces the download-type predicted Ephemeris with the self-predicted Ephemeris generated by procedure A2 for the GPS satellites of the satellite numbers 3 and 4 (procedure A3).

On the other hand, on the third day, the GPS information receiving unit 51 acquires Ephemeris from the GPS satellites of the satellite numbers 31 and 32.

Regarding the GPS satellites of the satellite numbers 31 and 32, since the error is small between the download-type predicted Ephemeris and the Ephemeris received from the GPS satellite (less than a threshold), it is different from procedure A1 and the download-type predicted Ephemeris is not replaced.

Application Example 2

Figure 6:
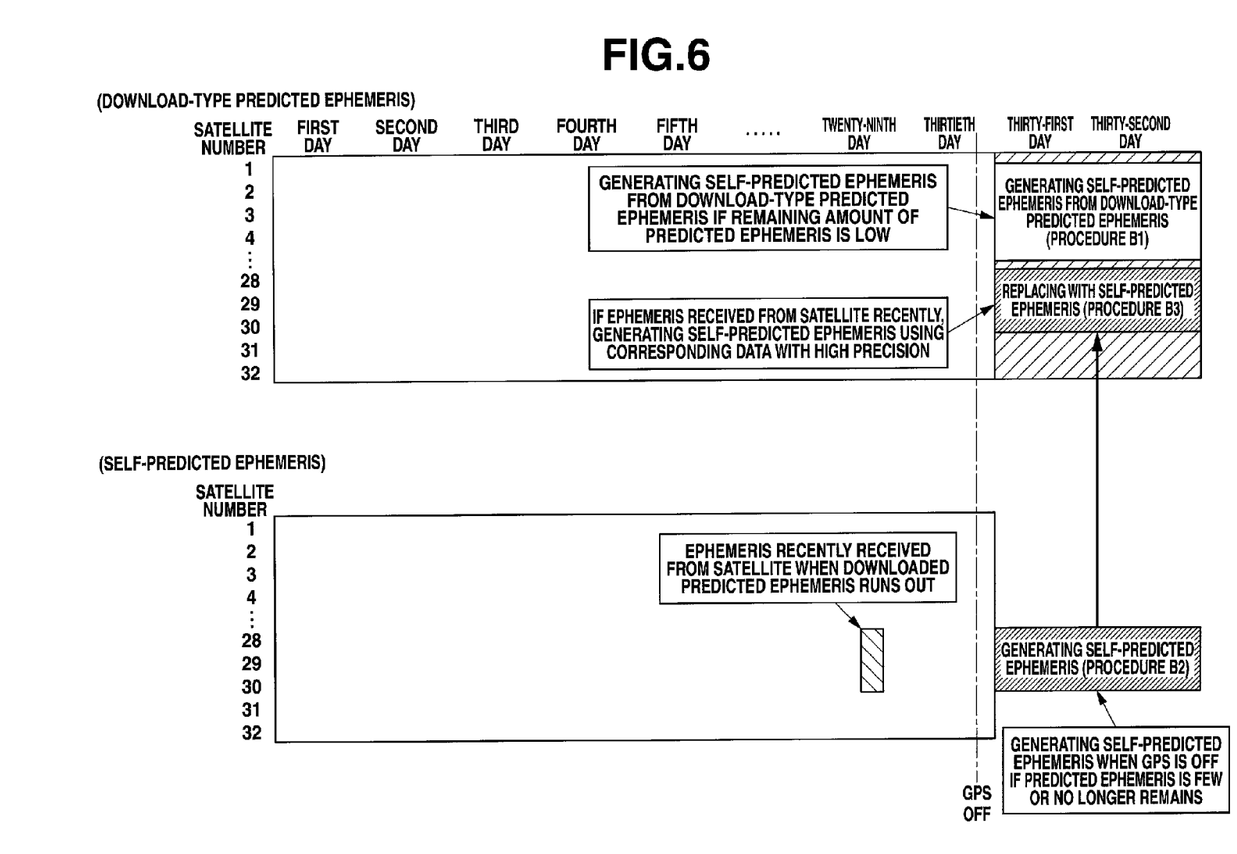
FIG. 6 is a view illustrating another application example of operations of the positioning processing apparatus 1.

FIG. 6 is a view illustrating another application example of operations of the positioning processing apparatus 1.

FIG. 6 shows a relationship between the number of GPS satellites (1 to 32) and acquisition date of the download-type predicted Ephemeris (upper side) and the self-predicted Ephemeris (lower side).

In FIG. 6, the predicted Ephemeris receiving unit 52 receives the download-type predicted Ephemeris on the first day. It should be noted that the validated period of the download-type predicted Ephemeris is 30 days.

Thereafter, it reaches the thirtieth day without the download-type predicted Ephemeris being updated.

Then, since the remaining amount of the download-type predicted Ephemeris is less than a threshold (for example, less than an amount for three days), the self-predicted Ephemeris generating unit 53 generates self-predicted Ephemeris based on the download-type predicted Ephemeris and sets it as the predicted Ephemeris retained by the positioning processing apparatus 1 (procedure B1).

On the other hand, on the thirtieth day, in a case in which the positioning processing apparatus 1 received Ephemeris from GPS satellites by way of the GPS information receiving unit 51, the self-predicted Ephemeris generating unit 53 generates self-predicted Ephemeris based on the Ephemeris received from the GPS satellite (procedure B2).

In this case, the self-predicted Ephemeris generating unit 53 generates self-predicted Ephemeris for only the GPS satellites of the satellite numbers 28 to 30 for which Ephemeris was received.

Furthermore, the self-predicted Ephemeris generated based on the Ephemeris received from the GPS satellite has higher precision than the self-predicted Ephemeris generated based on the download-type predicted Ephemeris. In this regard, for the GPS satellites of the satellite numbers for which the self-predicted Ephemeris generated in procedure B2 exists from among the self-predicted Ephemeris generated in procedure B1, the positioning control unit 43 replaces the self-predicted Ephemeris generated in procedure B2 with the self-predicted Ephemeris generated in procedure B1 (procedure B3).

As described above, the positioning processing apparatus 1 according to the present embodiment includes: the GPS information receiving unit 51; the predicted Ephemeris receiving unit 52; the feeder circuit 14; the determination unit 41; the selection unit 42; and the positioning unit 54.

The GPS information receiving unit 51 receives Ephemeris relating to an orbit of a satellite from a satellite.

The predicted Ephemeris receiving unit 52 receives a predicted value of Ephemeris via the network N from the assist server 2 in which Ephemeris is accumulated in advance.

The feeder circuit 14 controls electric power supply.

The determination unit 41 determines a state of electric power supply by the feeder circuit 14.

The selection unit 42 selects the GPS information receiving unit 51 or the predicted Ephemeris receiving unit 52 based on the state of electric power supply determined by the determination unit 41.

The positioning unit 54 performs positioning based on the Ephemeris or a predicted value of the Ephemeris received by the GPS information receiving unit 51 or the predicted Ephemeris receiving unit 52 selected by the selection unit 42.

In this way, it is possible to select whether to receive the Ephemeris via the GPS information receiving unit 51 or to receive the predicted Ephemeris via the predicted Ephemeris receiving unit 52 based on the state of electric power supply at the positioning processing apparatus 1.

Therefore, it is possible to appropriately reduce power consumption and perform positioning promptly.

Furthermore, the feeder circuit 14 performs control relating to power feeding and recharging of the battery that supplies electric power to the apparatus.

The determination unit 41 determines whether the battery is during recharging.

In a case in which it is determined by the determination unit 41 that the battery is during recharging, the selection unit 42 selects the predicted Ephemeris receiving unit 52.

In this way, it is possible to receive a predicted value of Ephemeris via the predicted Ephemeris receiving unit 52 in a state in which the battery is during recharging and electric power is supplied sufficiently.

Furthermore, the selection unit 42 determines whether the network N is available for the predicted Ephemeris receiving unit 52, in a case in which it is determined that the network N is available, the selection unit 42 selects the predicted Ephemeris receiving unit 52.

In this way, it is possible to select the predicted Ephemeris receiving unit 52 only in a case in which the predicted value of Ephemeris can be received via the network N.

Furthermore, the positioning processing apparatus 1 according to the present embodiment includes the self-predicted Ephemeris generating unit 53.

The self-predicted Ephemeris generating unit 44 generates the predicted value of Ephemeris based on at least either one of the Ephemeris received by the GPS information receiving unit 51 or the predicted value of the Ephemeris received by the predicted Ephemeris receiving unit 52.

In this way, even in a case in which the Ephemeris cannot be received by the GPS information receiving unit 51 or in a case in which the predicted Ephemeris cannot be received by the predicted Ephemeris receiving unit 52, it is possible to perform positioning promptly by generating a predicted value of Ephemeris from these.

The positioning unit 54 determines the remaining amount of valid predicted Ephemeris that is retained in an apparatus.

In a case in which it is determined by the positioning unit 54 that the remaining amount of the valid predicted Ephemeris retained in the apparatus is less than a threshold, the self-predicted Ephemeris generating unit 53 generates a predicted value Ephemeris.

In this way, it is possible to generate a predicted value of Ephemeris only in a case in which the remaining amount of the predicted Ephemeris is low, and thus it is possible to generate a predicted value of Ephemeris more efficiently.

The determination unit 41 determines the remaining amount of a battery.

The self-predicted Ephemeris generating unit 44 generates a predicted value of Ephemeris in a case in which it is determined by the positioning unit 54 that the remaining amount of valid predicted Ephemeris retained in an apparatus is less than a threshold and it is determined by the determination unit 41 that the remaining amount of a battery is less than a threshold.

In this way, it is possible to generate a predicted value of Ephemeris only in a state in which the remaining amount of the predicted Ephemeris is low and the remaining amount of the battery is low.

It should be noted that the present invention is not to be limited to the aforementioned embodiment, and that modifications, improvements, etc. within a scope that can achieve the object of the present invention are also included in the present invention.

It is described in the abovementioned embodiment that, in a case in which the remaining amount of the predicted Ephemeris is few or no longer remains, the self-predicted Ephemeris is generated based on Ephemeris acquired from GPS satellites or download-type predicted Ephemeris.

However, even in a case in which the remaining amount of the predicted Ephemeris is few or no longer remains, if it is obvious to recharge the battery before the positioning by GPS based on a routine life pattern or the like, it may be configured such that the positioning control unit 43 performs suitable control according to the routine life pattern or the like. In other words, it may be configured so that the positioning control unit 43 suppresses the generation of the self-predicted Ephemeris before recharging, waits until recharging is performed, and then acquires download-type predicted Ephemeris or generates self-predicted Ephemeris.

In the abovementioned embodiment, in a case of generating self-predicted Ephemeris, it may be configured so as to generate self-predicted Ephemeris only for specific GPS satellites with higher effect when self-predicted Ephemeris is generated.

A GPS satellite circles the earth in about twelve hours. Therefore, even on a different day, so long as the positioning by GPS is performed at the same time, it is highly likely to acquire GPS satellites with the same satellite numbers. Utilizing this aspect, in a case in which the GPS satellites to be acquired are known, it may be configured so as to generate self-predicted Ephemeris based on Ephemeris acquired from specific GPS satellites.

In this way, it is possible to generate self-predicted Ephemeris for only GPS satellites for which the possibility to be acquired is high (the possibility to be used for positioning is high).

Furthermore, in the abovementioned embodiment, although the positioning processing apparatus 1 to which the present invention is applied has been explained with a wristwatch as an example, the present invention is not limited thereto.

For example, the present invention can be applied to various electronic devices having a positioning function. More specifically, for example, the present invention can be applied to a lap-top personal computer, a portable navigation apparatus, a cell phone device, a smart phone, a digital camera, a portable gaming device, or the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the positioning processing apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program constituting the software is installed from a network or a storage medium into a computer or the like.

The computer may be a computer integrated into dedicated hardware. Alternatively, the computer may be a computer capable of executing various functions by installing various programs, e.g., a general-purpose personal computer.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and are not to limit the technical scope of the present invention. Various other embodiments can be employed for the present invention, and various modifications such as omissions and replacements are possible without departing from the spirit of the present invention. Such embodiments and modifications are included in the scope and spirit of the invention described in the present specification, and are included in the invention recited in the claims as well as the equivalent scope thereof.

What is claimed is:

1. A positioning processing apparatus comprising:
   an orbit information controller configured to:
      receive Ephemeris relating to an orbit of a positioning satellite from the positioning satellite;
      receive a predicted value of the Ephemeris via a network from a server in which the Ephemeris is accumulated in advance; and generate a self-predicted value of the Ephemeris based on at least one of the Ephemeris received from the positioning satellite and the predicted value of the Ephemeris received via the network;
a power feeding unit that performs control relating to electric power supply; and
a processor configured to:
   determine whether or not a remaining amount of a battery that supplies electric power to the apparatus is less than a threshold;
   select to receive the predicted value of the Ephemeris via the network when the remaining amount of the battery is determined to be not less than the threshold; and
   select to generate the self-predicted value of the Ephemeris when the remaining amount of the battery is determined to be less than the threshold;
wherein:
the orbit information controller performs positioning based on one of the Ephemeris received from the positioning satellite, the predicted value of the Ephemeris received via the network, and the self-predicted value of the Ephemeris,
the power feeding unit performs control relating to power feeding and recharging of the battery,
the processor is further configured to determine whether or not the battery is currently recharging,
in a case in which the processor determines that the battery is currently recharging, the processor selects one of the receiving the predicted value of the Ephemeris and the generating the self-predicted value of the Ephemeris, and
in a case in which the processor determines that the battery is not currently recharging, the processor determines a remaining amount of a predicted value of the Ephemeris that is valid and retained in the apparatus.

2. The positioning processing apparatus according to claim 1, wherein the orbit information controller is further configured to determine whether or not the network is available, and to receive the predicted value of the Ephemeris via the network in a case in which it is determined that the network is available.

3. The positioning processing apparatus according to claim 1, wherein the processor is further configured to determine, in a case in which it is determined that the remaining amount of the predicted value of the Ephemeris that is valid and retained in the apparatus is less than an Ephemeris amount threshold, whether or not the remaining amount of the battery is less than the threshold.

4. A positioning processing method using a positioning processing apparatus having a power feeding unit that performs control relating to power feeding and recharging of a battery that supplies electric power to the apparatus, the method comprising:
   determining whether or not a remaining amount of the battery is less than a threshold;
   selecting one of receiving a predicted value of Ephemeris and generating a self-predicted value of the Ephemeris; and
   performing positioning based on one of Ephemeris which is received from at least one positioning satellite, the predicted value of the Ephemeris, and the self-predicted value of the Ephemeris,
wherein the receiving the predicted value of the Ephemeris is selected in the selecting and performed via a network, when the remaining amount of the battery is determined in the determining to be not less than the threshold,
wherein the generating the self-predicted value of the Ephemeris is selected in the selecting and performed based on one of Ephemeris which is received from at least one positioning satellite in advance and the predicted value of the Ephemeris received via the network in advance, when the amount of the battery is determined in the determining to be less than the threshold, and
wherein the method further comprises:
   determining whether or not the battery is currently recharging;
   selecting one of the receiving the predicted value of the Ephemeris and the generating the self-predicted value of the Ephemeris, in a case in which it is determined that the battery is currently recharging; and
   determining a remaining amount of a predicted value of the Ephemeris that is valid and retained in the apparatus, in a case in which it is determined that the battery is not currently recharging.

5. A non-transitory computer-readable storage medium having a computer-readable program stored thereon that is executable by a computer having a positioning apparatus and a power feeding unit that performs control relating to power feeding and recharging of a battery that supplies electric power to the apparatus, the program being executable to control the computer to execute functions comprising:
   determining whether or not a remaining amount of the battery is less than a threshold;
   selecting one of receiving a predicted value of Ephemeris and generating a self-predicted value of the Ephemeris; and
   performing positioning based on one of Ephemeris which is received from at least one positioning satellite, the predicted value of the Ephemeris, and the self-predicted value of the Ephemeris,
wherein the receiving the predicted value of the Ephemeris is selected in the selecting and performed via a network, when the remaining amount of the battery is determined in the determining to be not less than the threshold,
wherein the generating the self-predicted value of the Ephemeris is selected in the selecting and performed based on one of Ephemeris which is received from at least one positioning satellite in advance and the predicted value of the Ephemeris received via the network in advance, when the amount of the battery is determined in the determining to be less than the threshold, and
wherein the program controls the computer to execute further functions comprising:
   determining whether or not the battery is currently recharging;
   selecting one of the receiving the predicted value of the Ephemeris and the generating the self-predicted value of the Ephemeris, in a case in which it is determined that the battery is currently recharging; and
   determining a remaining amount of a predicted value of the Ephemeris that is valid and retained in the apparatus, in a case in which it is determined that the battery is not currently recharging.

6. The method according to claim 4, wherein the selecting the one of receiving the predicted value of the Ephemeris and the generating the self-predicted value of the Ephemeris is performed in a case in which it is determined that the remaining amount of the predicted value of the Ephemeris that is valid and retained in the apparatus is less than an Ephemeris amount threshold.

7. The non-transitory computer-readable storage medium according to claim 5, wherein the program controls the computer such that the selecting the one of receiving the predicted value of the Ephemeris and the generating the self-predicted value of the Ephemeris is performed in a case in which it is determined that the remaining amount of the predicted value of the Ephemeris that is valid and retained in the apparatus is less than an Ephemeris amount threshold.

\* \* \* \* \*